US010293319B2

(12) United States Patent
Siemons

(10) Patent No.: US 10,293,319 B2
(45) Date of Patent: May 21, 2019

(54) METHOD AND APPARATUS FOR CONVERSION OF LIQUID FUELS IN A REACTOR, USE OF AN APPARATUS FOR CONVERSION OF LIQUID FUELS

(71) Applicant: CLEAN FUELS B.V., Enschede (NL)

(72) Inventor: Roland Siemons, Enschede (NL)

(73) Assignee: Clean Fuels B.V., Enschede (NL)

( * ) Notice: Subject to any disclaimer, the term of this patent is extended or adjusted under 35 U.S.C. 154(b) by 102 days.

(21) Appl. No.: 15/124,225

(22) PCT Filed: Mar. 13, 2015

(86) PCT No.: PCT/EP2015/055303
§ 371 (c)(1),
(2) Date: Sep. 7, 2016

(87) PCT Pub. No.: WO2015/144459
PCT Pub. Date: Oct. 1, 2015

(65) Prior Publication Data
US 2017/0072377 A1    Mar. 16, 2017

(30) Foreign Application Priority Data

Mar. 26, 2014  (NL) ..................................... 2012508

(51) Int. Cl.
*B01J 19/26*  (2006.01)
*B01J 4/00*  (2006.01)
(Continued)

(52) U.S. Cl.
CPC ........... *B01J 4/002* (2013.01); *B01J 19/0026* (2013.01); *C01B 3/02* (2013.01); *C01B 3/22* (2013.01);
(Continued)

(58) Field of Classification Search
CPC .... F23K 2301/205; F23K 5/22; F23D 11/441; F23D 2900/00016; F23D 7/00;
(Continued)

(56) References Cited

U.S. PATENT DOCUMENTS

2006/0154189 A1*  7/2006  Ramotowski ............. F23K 5/22
                                                                    431/9
2010/0229558 A1    9/2010  Dimascio et al.
2012/0168537 A1    7/2012  Pavel et al.

FOREIGN PATENT DOCUMENTS

GB    2106632 A    4/1983
WO    2006/063126 A2    6/2006

OTHER PUBLICATIONS

NL2012508, Search Report & Written Opinion, dated Dec. 4, 2014, The Netherlands Patent Office.
(Continued)

*Primary Examiner* — Amber R Orlando
*Assistant Examiner* — Syed T Iqbal
(74) *Attorney, Agent, or Firm* — Millman IP Inc.

(57) ABSTRACT

In an apparatus comprising a chamber (3) of a reactor drops (8) of a to be converted liquid are generated by a nozzle (2) positioned in a space (7) separate from the chamber (3). The drops (8) make a free fall thought the space 7 and enter via an opening (7a) the chamber (3) where they fall onto an evaporator body (9) for evaporation, the evaporated liquid leaves a solid deposit (1), A gaseous reactant line (11) supplies a reactant gas for conversion of the solid deposit (1) on the surface of the evaporator body.

13 Claims, 8 Drawing Sheets

(51) Int. Cl.
  *F23D 7/00* (2006.01)
  *F23D 9/00* (2006.01)
  *C01B 3/22* (2006.01)
  *B01J 19/00* (2006.01)
  *C01B 3/02* (2006.01)
  *C10J 3/48* (2006.01)

(52) U.S. Cl.
  CPC ............ *C10J 3/48* (2013.01); *C10J 3/485* (2013.01); *F23D 7/00* (2013.01); *F23D 9/00* (2013.01); *B01J 2219/00247* (2013.01); *C01B 2203/0266* (2013.01); *C01B 2203/0272* (2013.01); *C10J 2200/152* (2013.01); *C10J 2300/0916* (2013.01); *C10J 2300/0956* (2013.01); *C10J 2300/0976* (2013.01); *C10J 2300/1637* (2013.01); *F23D 2900/00016* (2013.01)

(58) Field of Classification Search
  CPC ............... F23D 9/00; B01J 19/0026; B01J 2219/00247; B01J 4/002; C01B 2203/0266; C01B 2203/0272; C01B 3/02; C01B 3/22; C10J 2200/152; C10J 2300/0916; C10J 2300/0956; C10J 2300/0976; C10J 2300/1637; C10J 3/48; C10J 3/485
  See application file for complete search history.

(56) References Cited

OTHER PUBLICATIONS

PCT/EP2015/055303, International Search Report & Written Opinion, dated May 25, 2015, European Patent Office.

\* cited by examiner

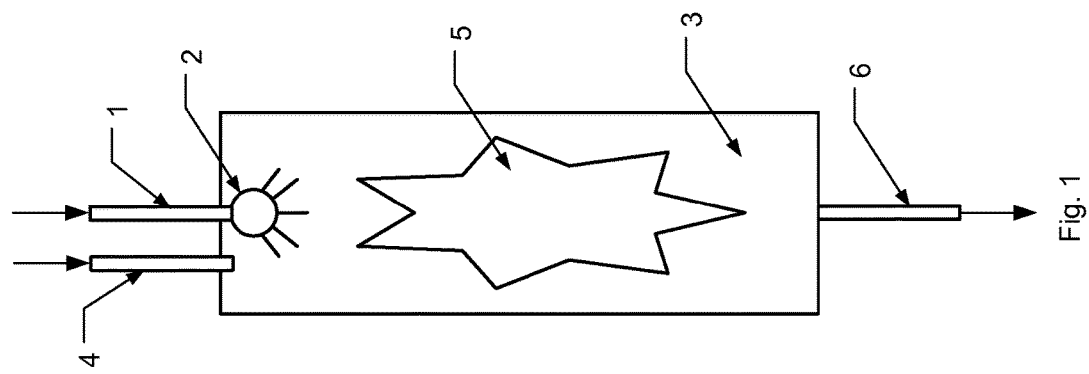

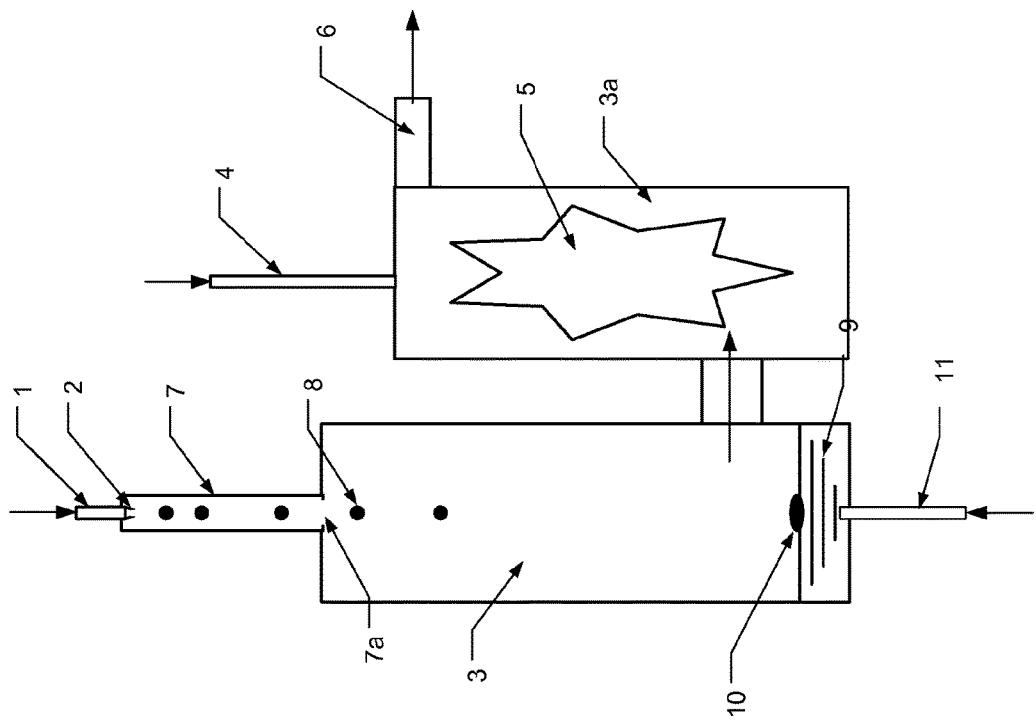
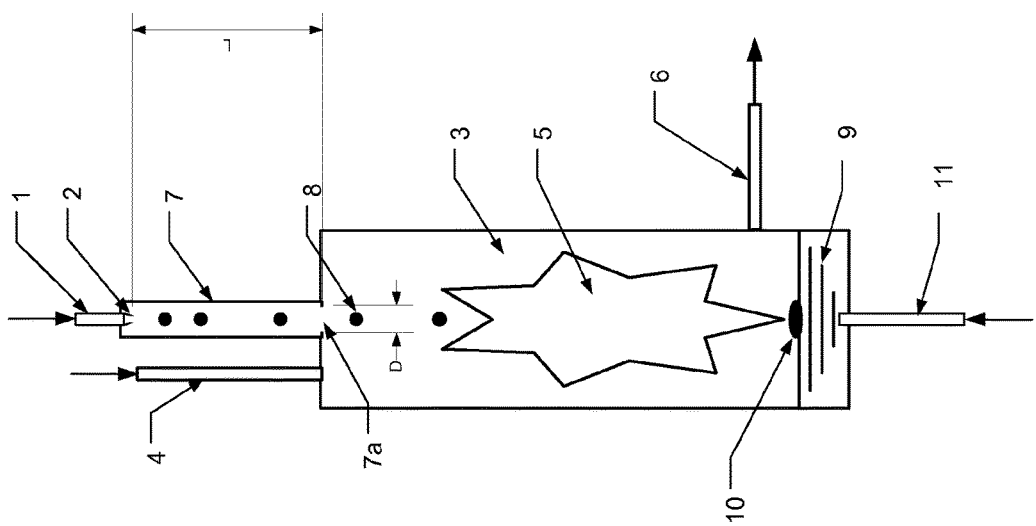

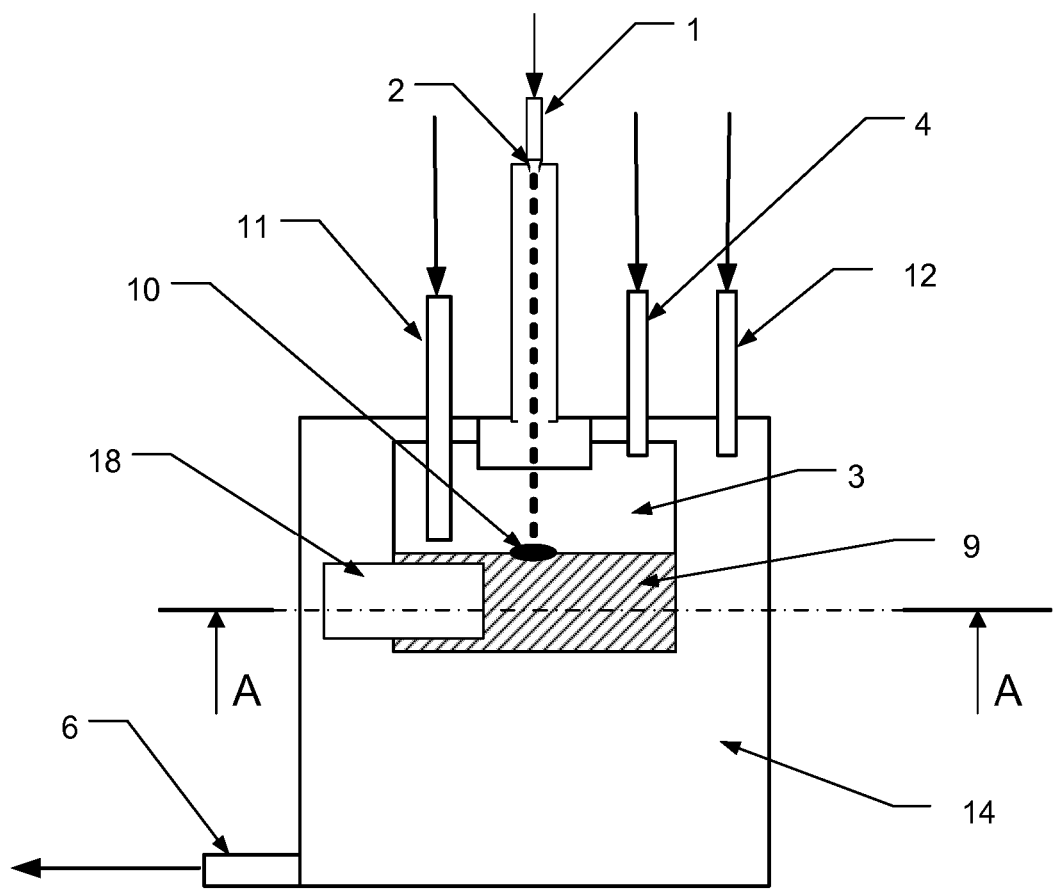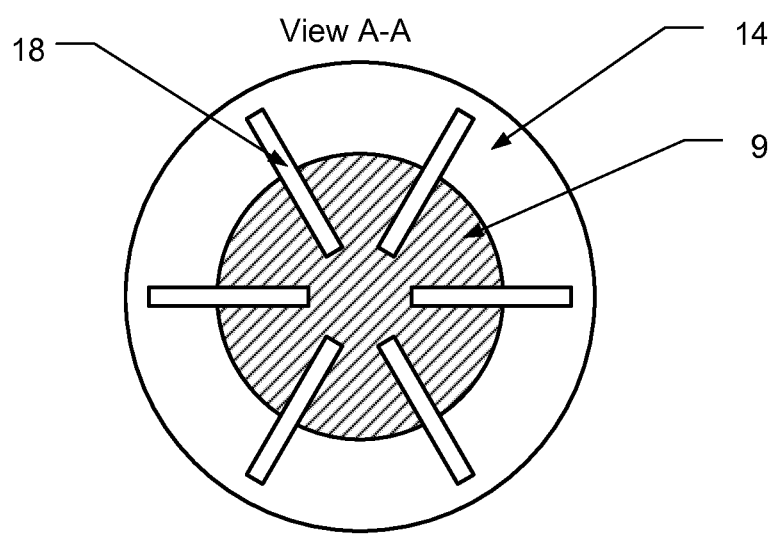
Fig. 5

METHOD AND APPARATUS FOR CONVERSION OF LIQUID FUELS IN A REACTOR, USE OF AN APPARATUS FOR CONVERSION OF LIQUID FUELS

FIELD OF THE INVENTION

The present invention relates to a method and an apparatus for the injection of coking liquid fuels into a reactor. The invention also relates to the use of an apparatus for the injection of coking liquid fuels.

Coking liquid fuels are used in reactors for high-temperature chemical conversion, specifically in combustors and gasifiers, although they can also be used in or for gas turbines and even in reciprocating engines.

BACKGROUND ART

Known standard reactors comprise a nozzle for providing liquid fuel, an inlet for a gaseous reaction agent (such as air), a reaction chamber forming a reaction zone (such as a furnace or oven, or a gasifier or another high-temperature reactor) and an exhaust for exhausting the reaction product formed in the reaction zone. The thermal instability of liquid fuels is of concern for the operation and maintenance of many types of reactors (including reciprocating engines and gas turbines) and of gasification reactors. Thermal instability of liquid fuels is the fuel's tendency at elevated temperatures to form deposits on fuel lines, valves, injectors, and reaction chamber surfaces. Particularly fuel injectors are vulnerable to deposition of solid residues caused by auto-oxidation (fouling) or cracking while depositing solid carbon (coking). Fouling and coking can cause equipment failure, equipment malfunction, and affects equipment performance. Fouling and coking can lead to increased maintenance costs, to equipment vulnerability and to decreased reliability. In prior art devices a solid deposit frequently occurs at the nozzle tip. This results in clogging of the nozzle tip and hence disruption of the supply of the liquid fuel, reducing the efficiency of the process and, after time the need for removing the coke residue which often means down time for the reactor and thus a further reduced efficiency.

US 2001/229558 discloses a nozzle suitable for fuel injection in pyrolysis reactors. The nozzle is shielded with an insulator.

SUMMARY OF THE INVENTION

It is an object of the invention to inject fuel into a chamber, and thereby to reduce or even prevent the build-up of a solid residue at the nozzle to provide a more reliable and efficient process and device. The invention is based on the insights that the elevated temperature that causes the instability of the fuel is heat transfer from the chamber to the nozzle, and that a major heat transfer mechanism to nozzles in prior art arrangements is radiation; and that cooling and insulation of a nozzle are prior arts that serve to reduce the nozzle temperature, but as it appears, cooling and/or insulation cannot always be utilized sufficiently or effectively. Particularly radiation and its effects cannot be prevented by means of insulation. In the invention, a fuel injection nozzle is positioned in a space separate from the chamber and the nozzle is arranged to provide free falling drops or a free falling jet of fuel into the chamber via an opening in the wall of the chamber without touching a solid surface before entering the chamber. This arrangement of placing the nozzle in a space separate from the chamber, puts the nozzle remote from any hot zone in the chamber and provides a small solid angle of the nozzle towards the chamber, i.e. a solid angle that is confined by the nozzle tip and the opening in the chamber wall, thus reducing substantially the radiant heat transfer from hot zones in the chamber to the nozzle. The reduction of radiant heat transfer, as a result of the invention, reduces the temperature of the nozzle to a level where fouling and/or coking at the nozzle do no longer occur or are reduced to an acceptable level. The solid angle confined by the nozzle and the opening in the chamber wall giving access to the chamber is smaller than 0.785 sr and more preferably smaller than 0.126 sr, and even more preferably smaller than 0.0314 sr.

In prior art devices the nozzle atomizes the liquid inside the chamber, the nozzle being inside or very close to the chamber with the associated large probability of fouling or coking. Positioning the nozzle in a space separate from the chamber, according to the invention, has the drawback that atomization is no longer practically possible, or at least considerably less technically feasible. The standard atomization of fuel, sprays the fuel at an angle that is larger than 50° and its use in combination with nozzle placement according to the invention, would result in the deposition of fuel at hot material surfaces where coking or fouling is to be avoided, i.e. material surfaces along the fuel's pathway to and up until its entry into chamber, and particularly at the edge of the opening in the wall of the chamber. If the liquid fuel gets in contact with such hot material surfaces, coking or fouling would again occur, and result in undesired blockage of the fuel feed. Rather than forming an atomized spray, the nozzle according to the invention, provides fouling or coking liquid fuels in the form of drops or a jet falling freely, i.e. drops or a jet that do not touch any solid surface before entering the chamber. The free fall of the fuel drops or fuel jet is the cause that the liquid fuel does not touch hot material surfaces where coking or fouling is to be avoided, i.e. at least along the fuel's pathway to and up until its entry into the chamber, and particularly at the edge of the opening in the chamber wall giving access to the chamber. The placement of the nozzle relative to the opening in the wall of the chamber ensures the uninterrupted free fall of the drops or the jet. In one embodiment, preferably the nozzle is placed vertically above the opening in the wall of the chamber.

After entering the chamber via the opening and after the free fall, the liquid in the shape of drops or a jet hits the surface of a heated evaporator body. At its surface, the heated evaporator body promotes evaporation (instead of atomization) of the fuel in the chamber. The evaporate matter is then available for further chemical processing in the chamber, or in an adjacent further chamber.

Since the fuel is a coking fuel, the evaporation will lead to the formation of solid deposits at the surface of the evaporator body. In the case of an evaporator body that is porous (e.g. a fixed bed of pebbles), the surface area with solid deposits may reside inside the fixed bed. Any such solid deposits on or inside the evaporator body are in the device and method converted into a gas by providing a reactant (such as air or steam) via a gaseous reactant line to the location inside the reactor where the solid deposit is formed. The mixture of evaporate and converted solid deposit is available for reaction, which can take place directly above, inside or outside the evaporator body or in a separate chamber.

The invention is also embodied in a method for conversion of a liquid fuel in an apparatus for conversion of liquid fuels, wherein, a flow of liquid fuel is provided through a nozzle that is positioned in a space separate from a chamber such that the nozzle is located remote from any hot zone in the chamber and that there is a small solid angle defined by the nozzle tip and the opening of the chamber, smaller than $\pi/4$ sr, more preferably smaller than $\pi/16$ sr and even more preferably smaller than $\pi/100$ sr, and most preferably smaller than $\pi/400$ sr; and wherein, the nozzle is arranged to provide free falling drops or a free falling jet of fuel into the chamber via an opening in the wall of the chamber, in such a way that the drops or the jet do not touch any solid surface before entering the chamber; and wherein inside the chamber the drops or the jet hits the surface of a heated evaporator body which promotes evaporation of the fuel, thereby converting any remaining solid deposits on or inside the evaporator body into a gas by providing a reactant gas such as air or steam.

The evaporate and any solid deposits converted into gas are then available for reaction, occurring directly above, inside or outside the evaporator body or in a separate chamber.

The chamber may be configured as a combustion reactor serving to combust the evaporate and any converted solid matter. The chamber may be configured as a gas generator serving to yield a synthesis gas or a gas consisting of suitable gaseous precursors of synthesis gas or a producer gas (a fuel gas) from the evaporate and any converted solid matter.

The evaporator body may be formed of or comprises:

A fixed bed of sand or other refractory particles;

A fluidized bed of sand or other refractory particles;

A spouted bed of sand or other refractory particles;

A fixed bed of pebbles, beads, or another type of packing material, or another porous refractory material;

A horizontal or an inclined (flat, convex or concave) plate made of a high-temperature resistant material such as steel, ceramics, stone, or another refractory material.

If the evaporator body comprises a fluidized bed of particles or a spouted bed of particles, the fluidisation or spouting medium is preferably a gas (e.g. air or steam) which may act as a reactant for the evaporate and/or any solid matter deposits;

The material of the evaporator body preferably provides a sufficiently large thermal inertia to stabilize fluctuations in fuel characteristics (e.g. changing moisture contents of the fuel results in large changes of heat requirement). The quantity of thermal inertia is determined by the variations in fuel properties, and the required temperature range of the evaporator body.

Evaporation is known to be endothermic. The heat of evaporation is supplied to the evaporator body by means of (as a single means or as a combination of means):

Hot gas (e.g. air or steam);

Radiation (e.g. from the chamber);

Radiation, convection and/or conduction from outside the chamber (e.g. from a further chamber);

The heat of reaction resulting from the reaction of the solid deposit with a reactant.

The heat of reaction resulting from the reaction of the evaporate with a reactant.

Preferably the flow of reactants is arranged along or around the evaporator body so that heat is transferred from the reaction products to the evaporator body.

The invention is also embodied in a use of the apparatus according to the invention wherein the fuel fed to the nozzle is a pyrolytic liquid. Many pyrolytic liquids are made from biomass, and if made from sustainable resources, these liquids are also sustainable, particularly neutral in view of global climate change. Fouling and coking are known severe issues for biomass based pyrolytic liquids.

BRIEF DESCRIPTION OF THE DRAWING

These and other advantageous aspects of the invention are described in more detail using the following figures.

The figures contained in the drawing show the following:

FIG. 1 illustrates a device and method as per the prior art;

FIGS. 2A and 2B illustrate examples of a method and device according to the present invention;

FIGS. 4, 5, 6, 7 and 8 illustrate further embodiments of a method and device according to the invention.

The figures are exemplary figures, wherein, as a rule, like numerals denote like elements.

DETAILED DESCRIPTION OF PREFERRED EMBODIMENTS

Figure 3:
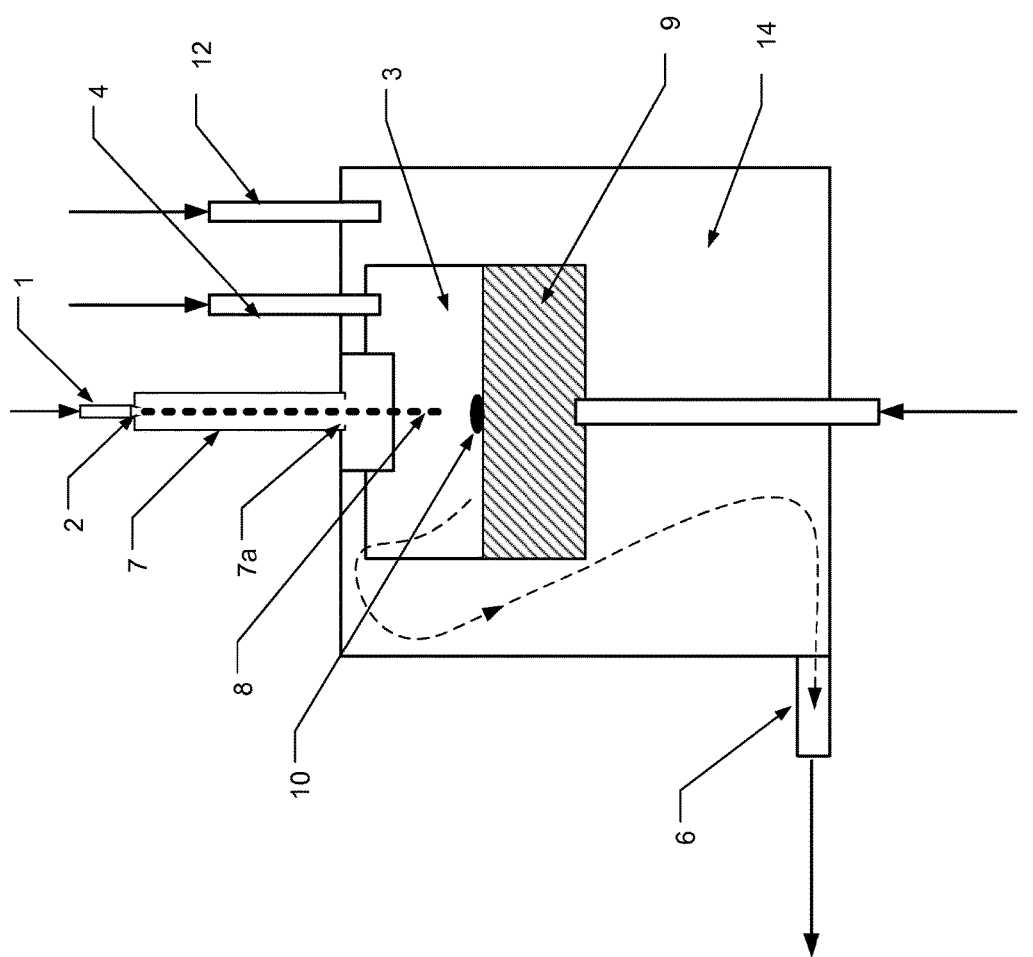
FIG. 3 illustrates an embodiment of the invention.

FIG. 1 illustrates a method and device as per the prior art. Via a liquid fuel line 1 which ends in a spray nozzle 2, fouling or coking liquid fuel is atomized inside chamber 3. Line 4 feeds a gaseous reactant into chamber 3. Inside chamber 3 a reaction takes place, for instance a flame 5 is created. Exhaust products leave chamber 3 via an exhaust 6.

In prior art devices a solid deposited matter frequently occurs at the nozzle tip. This results in clogging of the nozzle 2 and hence disruption of the supply of the fouling or coking liquid fuel in chamber 3, reducing the efficiency of the process and, after time, the need for removing the solid residue which often means down time for the reactor and thus a further reduced efficiency.

FIG. 2A illustrates a method and device according to the invention. The nozzle 2 is positioned remote from the reaction zone 5 at a spot with reduced radiation due to a small view factor of chamber 3. Preferably the nozzle is positioned in a space, in this example a tube or elongate chamber 7, with a circular opening 7a leading into the chamber 3. The distance L between the nozzle and opening 7a is preferably at least larger than the diameter D of opening 7a (i.e. L/D>1). Since opening 7a is circular this implies that the solid angle confined by the nozzle 2 and the opening 7a is smaller than $\pi/4$ sr. At such position the build up of solid deposit at nozzle 2 is strongly reduced as a result of declined radiative heat transfer. A distance L such that L/D>2 is more preferred (implying solid angle $<\pi/16$ sr), and such that L/D>5 is even more preferred (implying solid angle $<\pi/100$ sr), and L/D>10 is most preferred (implying solid angle $<\pi/400$ sr). In prior art devices the nozzle 2 atomizes the liquid, and the nozzle is placed inside or at the wall chamber 3. The solid angle of a nozzle positioned at the wall of a chamber 3 is $2\pi$ sr, which is substantially larger than the solid angles proposed by the invention. The thermal heat radiation on a nozzle that atomizes the fuel inside the chamber is accordingly larger. However, positioning the nozzle in a separate chamber at a location remote from the reaction zone 5 has the drawback that atomization is considerably less to even no longer practically possible. Much of the atomized fuel would hit the walls of the tube 7. Rather than forming an atomized spray the nozzle, according to the invention, provides fouling or coking liquid fuels in the form of drops 8 or a jet. The drops 8 make a free fall without hitting the walls of the tube 7. The drops 8 or the jet only very partially react in the reaction zone 5, in this example, before they arrive at the surface of the heated evaporator body 9 below the reaction zone 5. The heated evaporator body 9 promotes at its surface evaporation (instead of atomization) of the liquid drops 8 or jet adjacent to the reaction zone 5. The evaporate matter is then available for further chemical processing in the reaction zone 5 adjacent to the heated surface of the evaporator body 9 inside the chamber.

The evaporation will lead to the formation of solid deposits 10 on or in the heated surface of the evaporator body 9. Such solid deposits 10 on or in the heated surface 9 where the evaporation takes place are converted in the method and device according to the invention into a gas by providing a reactant (such as air or steam) via a gaseous reactant line 11 to or near to a location inside the reactor where the solid deposit 10 is formed.

In this example the reaction zone 5 is provided inside the same chamber 3 wherein the hot evaporator body 9 is provided. The gaseous mixture of evaporate and solid deposit converted into gas may also be fed into a further chamber.

In the embodiment of FIG. 2 a line 4 for feeding a gaseous reactant is also provided. This is because in this example the reaction takes place in chamber 3.

FIG. 2B illustrates an embodiment in which in chamber 3 a mixture of evaporate and gas from conversion of the solid deposit is made. This mixture is fed into a further chamber 3a, in which a reaction take place. This further chamber 3a is, in this example fed via line 4 with a reactant gas.

FIG. 3 illustrates an embodiment of the invention. As in FIG. 2 the nozzle 2 creates drops or jet 8 of fuel which travels through the reaction zone 5 in chamber 3 and fall on the surface of evaporator body 9 which is permeable for gas (e.g. a bed of pebbles). Evaporation takes place and solid deposits 10 are formed. Via a gas line 11 a reactant is supplied through the permeable evaporative body for conversion of solid deposit 10. The reactant products 13 are lead to the exhaust line 6 via a chamber 14 at least partly surrounding the chamber 3. The reactant products flow along or around the evaporator body 9 and part of the heat in the reaction product flow 13 is transferred to the evaporator body 9. Optionally and preferably a tertiary gas line 12 provides a reactant gas for a further reaction in chamber 14. In such preferred embodiment the chamber 3 forms a primary chamber and chamber 14 a secondary chamber.

The evaporator body 9 can comprise various materials:
A fixed bed of sand or other refractory particles;
A fluidized bed of sand or other refractory particles;
A spouted bed of sand or other refractory particles;
A fixed bed of pebbles, beads, or another type of packing material, or another porous refractory material;
A horizontal or an inclined (flat, convex or concave) plate made of a high-temperature resistant material such as steel, ceramics, stone, or another refractory material.

A bed of particles is preferred since this increases the surface area and allows and easy access of the secondary gas flow to the solid deposit 10. Instead of sand other materials such as mineral or ceramic materials or glass may be used for the bed, or a mixture of different types of particles (sand, ceramic, mineral, glass). The particles in the bed may form an inert material, but may, however, also be doped with or comprise substances that aid in the evaporation or reaction or in the reduction of coke formation such as a catalyst. For simplicity only a single nozzle is shown. The provision of more than one nozzle to spread the liquid over a larger surface of the evaporative body is possible and in some embodiments preferred.

Figure 4:
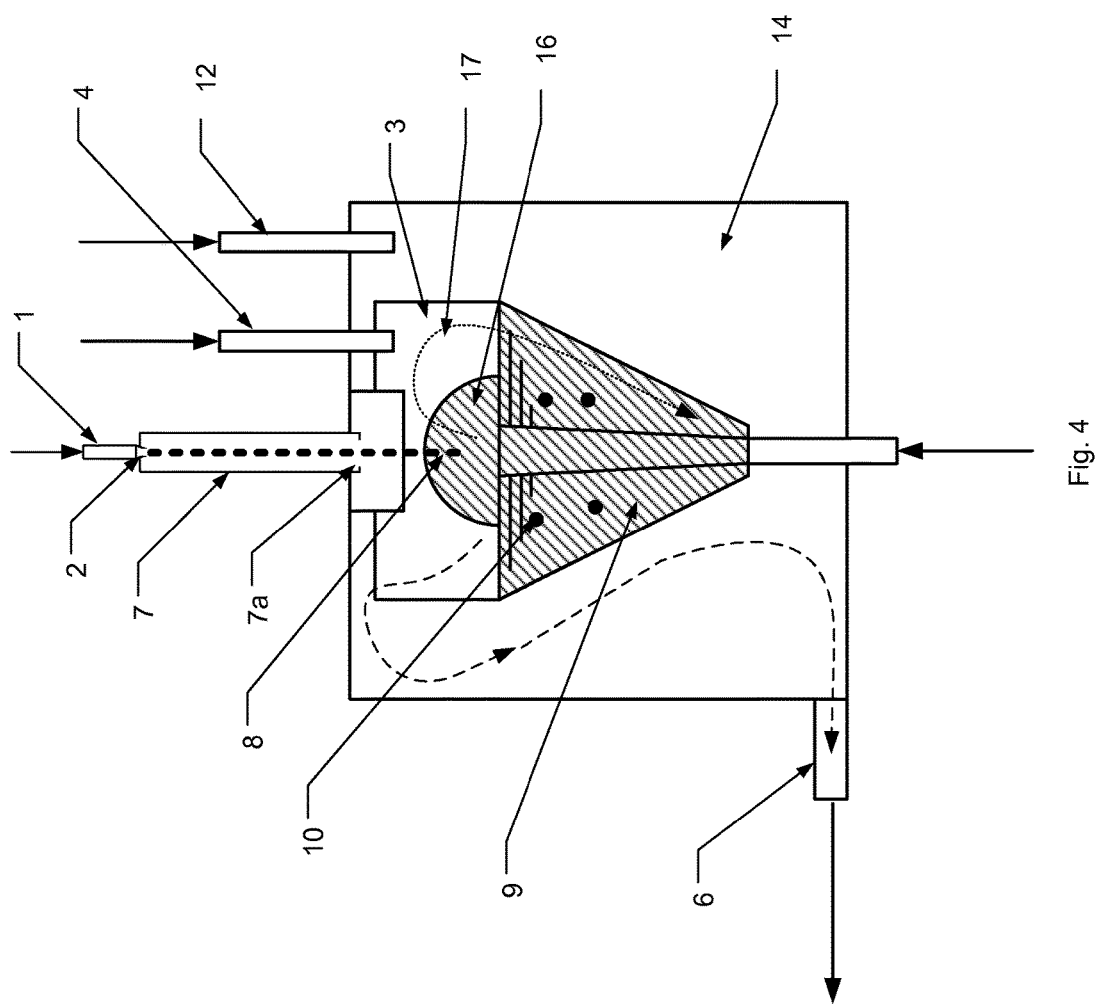

FIG. 4 illustrates a variation of the embodiment of FIG. 3. In this embodiment a spouted bed of sand or other particles is used. A spout fountain 16 is formed and the solid particles flow approximately as indicated by arrow 17. The heat supply to the evaporative body 9 for evaporating the fluid drops 8 falling on the evaporative body is provided in this embodiment by four sources, 1) coke (solid deposit) conversion inside the spouted bed, 2) heat transfer by particles moving through the freeboard of the chamber taking up heat from the conversion of evaporate, 3) heat transfer by particles picking up heat at near the bottom and sides of the funnel and 4) by heat transfer from the hot gas flowing through the sand bed.

FIG. 5 illustrates a further example of an apparatus of the invention. In this embodiment heat transfer fins 18 are used to increase heat transfer from the secondary chamber 14 to the evaporative body 9. The gaseous reactant via line 11 is provided directly above the surface of evaporative body 9 near the solid deposition 10.

Figure 6:
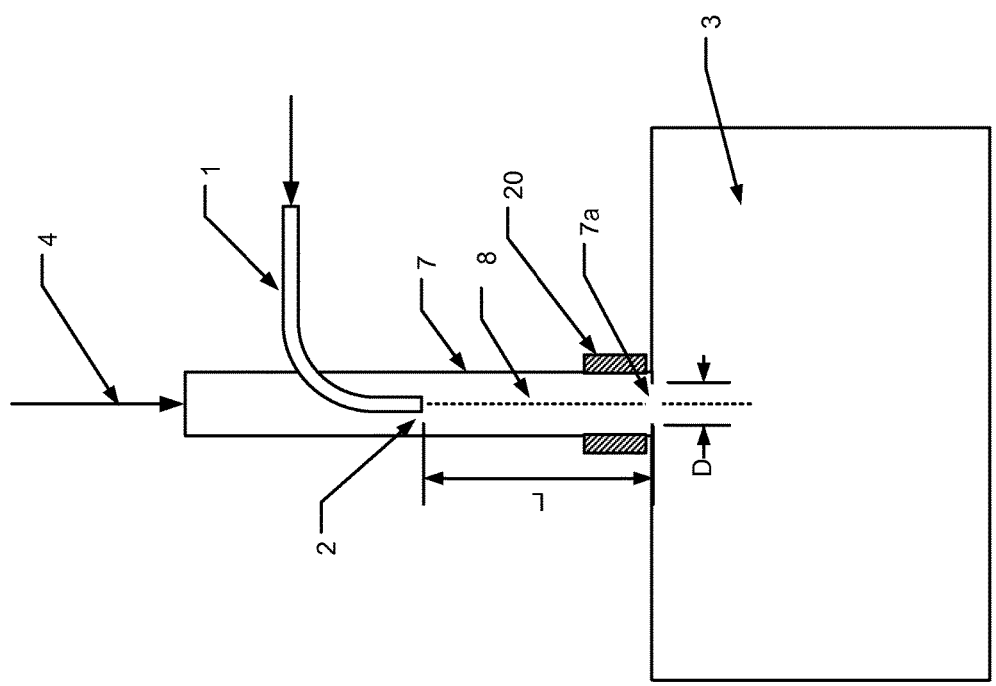

FIG. 6 illustrates a preferred embodiment of the invention. In the previous figures two lines were used for providing drops 8 or the jet and the primary reactant gas via line 4. FIG. 6 illustrates a set-up in which a single feed line is used for both the primary gas reactant and the coking liquid fuel supply. The flow of the primary gaseous reactant, for instance air, may be laminar or turbulent. Preferably the difference in velocity of the two media (air and liquid) is small, to ensure that the liquid drops freely into the chamber 3, without touching the wall of line 7. The same considerations as to L/D and the solid angle as described with FIG. 2A apply.

In case of an embodiment such as provided in FIGS. 4 and 5, the freely falling drop or jet causes, immediately adjacent to the falling matter inside tube or chamber 7, a movement of gas in the same direction. And, in turn, that movement may be the cause of gaseous whirls inside the same tube or chamber 7. It may even happen that gaseous matter residing in chamber 3 is transported in counterflow with the freely falling drops or jet, even into tube or chamber 7, i.e. a gaseous backflow. Since tube or chamber 7 is essentially colder than chamber 3, liquids or solids may be formed inside tube or chamber 7 and ultimately result in fouling or blockage. This can be prevented by providing a gas flow together with the freely falling drop or jet, 1/ to such an extent that the said gaseous back-flow is merely compensated. FIG. 6 shows a situation where 2/ the compensating gas flow through tube or chamber 7 consists of the entire primary gas reactant.

Figure 7:
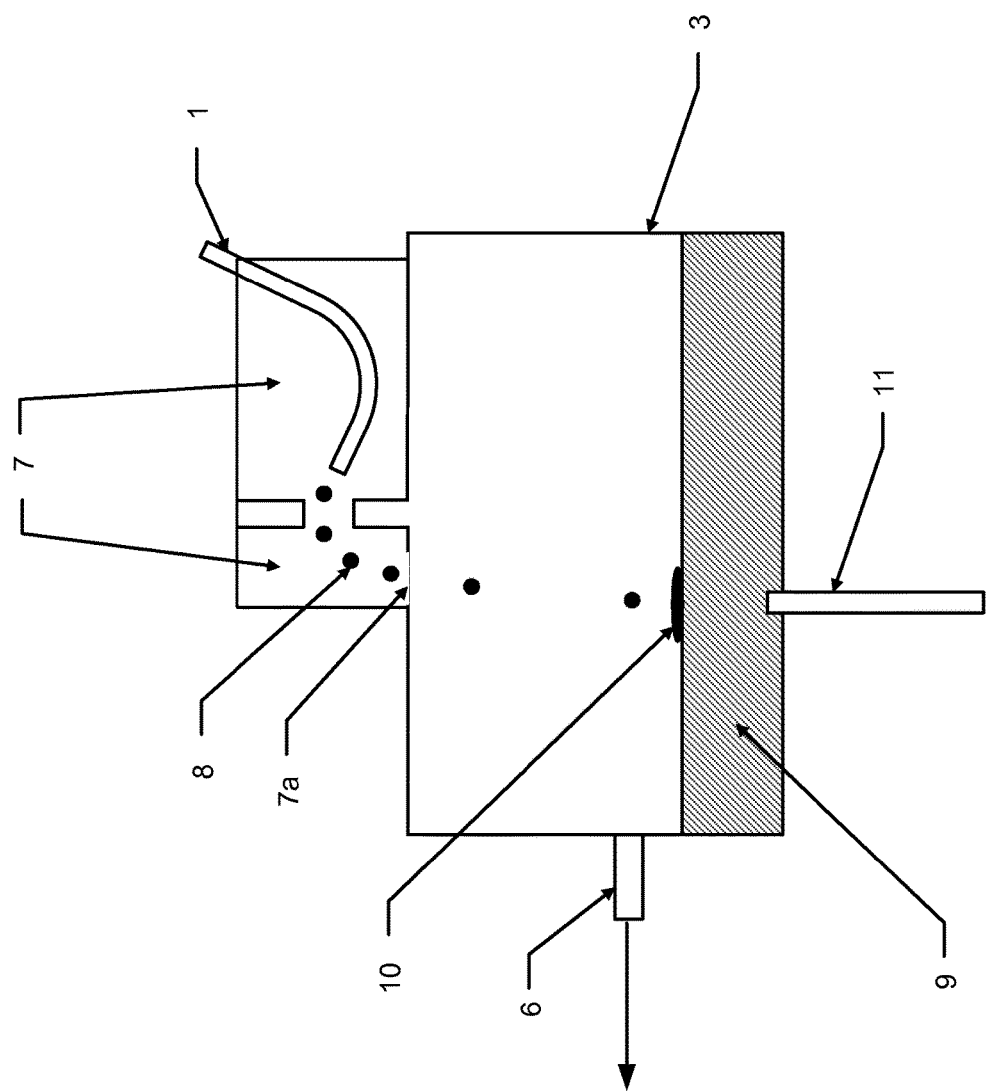

FIG. 7 illustrates a different embodiment of the invention. In this embodiment the nozzle 2 is, as in the previous embodiments, provided in a space 7 separate from chamber 3 in which chamber 3 the evaporator body 9 is provided, The nozzle ejects a jet 8, the jet has a starting velocity. The jet makes, after leaving the nozzle 2 a free fall through space 7, i.e. it does not hit the walls of space 7, it exits space 7 at opening 7a and enters chamber 3 where the jet 8 continues the free fall, until it hits the evaporator body 9, where it is evaporated and leaves a solid deposit, which is converted into a gas by means of a gaseous reactant fed via line 11, as illustrated in previous figures. This embodiment has the advantage that the nozzle can be positioned out of or almost completely out of the direct line of sight of a hot zone in chamber 3, for instance the hot zone formed by the surface of the evaporator body or by a reaction 5.

Figure 8:
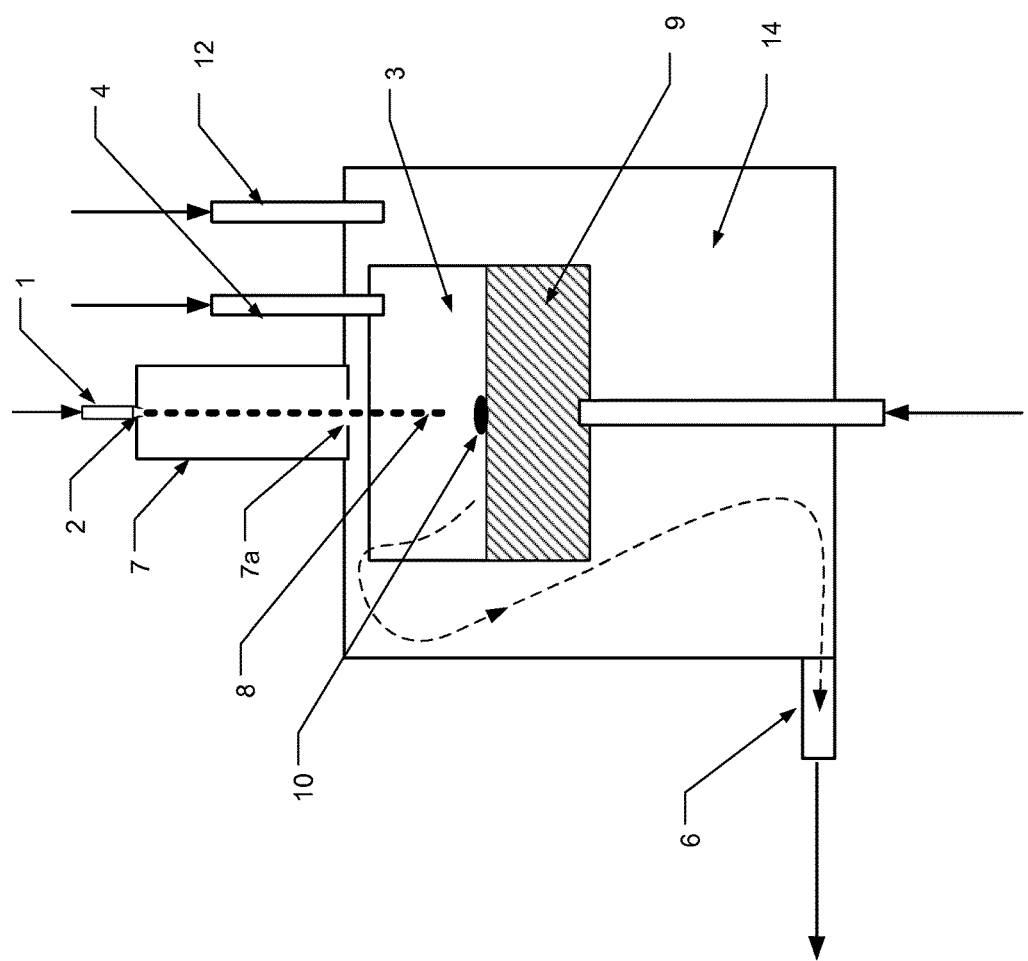

Another embodiment (FIG. 8) addresses the issue of fouling or blockage of tube or chamber 7 discussed with respect to FIG. 6 in a different manner by constructing tube or chamber 7 as a wide hollow body. The exit opening for the fuel drops or fuel jet remains equally small so as to determine the required small view factor for the fuel nozzle relative to chamber 3. This embodiment reduces a gaseous back-flow from chamber 3 into tube or chamber 7.

Preferably the walls of space 7 are covered with a layer to reduce reflection of infrared radiation, or the walls are made of a material with a low IR reflection coefficient. This reduces indirect thermal heat radiation reaching the nozzle.

Preferably insulation materials are used to reduce heat conduction from chamber 3 to the nozzle through the wall of tube or chamber 7.

The invention is embodied in the apparatus as shown in the figures and as described and also in the method as described. Furthermore the invention is embodied in the use of the apparatus as shown and described in the conversion of liquids and in particular of pyrolytic liquids, made from biomass.

The invention is particularly of interest for stationary devices.

The invention is also in particular advantageous for the combustion of biomass pyrolysis oil at small scales in the range of 10-2000 kW, in particular in the range 10-500 kW, for which kW range there is at present no technique or apparatus available at affordable costs.

An embodiment of the invention is a burner in the range of 10 to 200 kW for fuelling with pure plant oil (PPO) and pure biomass pyrolysis oil.

In summary, the invention can be described as follows: In an apparatus comprising a chamber (3) of a reactor drops (8) of a to be converted liquid are generated by a nozzle (2) positioned in a space (7) separate from the chamber (3). The drops (8) make a free fall thought the space 7 and enter via an opening (7a) the chamber (3) where they fall onto an evaporator body (9) for evaporation, the evaporated liquid leaves a solid deposit (1), A gaseous reactant line (11) supplies a reactant gas for conversion of the solid deposit (1) on the surface of the evaporator body.

The invention claimed is:

1. An apparatus for the injection of coking liquid fuels into a reactor comprising a chamber (3) in a reactor for high-temperature chemical conversion and a feed line (1) for a liquid comprising a nozzle (2) for providing fuel to the chamber (3), and an exhaust (6) characterized in that the nozzle (2) is positioned in a space (7) separate from the chamber (3) and the nozzle (2) is arranged such that drops (8) or a jet of liquid are formed which make a free fall into the chamber via an opening (7a) in the space (7) leading into the chamber (3), in such a way that the drops or the jet do not touch any solid surface before entering the chamber, and the chamber (3) comprises an evaporative body (9) for receiving the drops (8) or jet, and for evaporating the drops fallen on the evaporative body (9), the apparatus comprising at least one heat source for supplying heat to the evaporative body, and a gaseous reactant supply line (11) for supplying a further reactant gas for conversion of a solid deposit formed by evaporation of the drops on the evaporative body (9), wherein a solid angle confined by the nozzle tip (2) and the opening (7a) is less than $\pi/4$ sr.

2. The apparatus as claimed in claim 1, wherein the nozzle is arranged for making drops of fuel fall vertically wherein the distance (L) between the nozzle (2) and the opening (7a) is at least larger than the diameter (D) of the opening (7a).

3. The apparatus as claimed in claim 2, wherein the distance (L) between the nozzle (2) and the opening (7a) is at least five times larger than the diameter (D) of the opening (7a).

4. The apparatus as claimed in claim 1, characterized in that the evaporative body (9) comprises a bed of particles and the gaseous reactant supply line (11) is arranged to feed the gaseous reactant gas to the bed of particles.

5. The apparatus as claimed in claim 4, characterized in that the bed of particles is a fluid bed.

6. The apparatus as claimed in claim 4, characterized in that the bed of particles is a spouted bed.

7. The apparatus as claimed in claim 1 wherein the apparatus comprises a second chamber (14) and the reactive products from the chamber in operation flow along an outer surface of the evaporative body for heat transfer to the evaporative body.

8. The apparatus as claimed in claim 7, wherein a further gaseous reactant supply line (12) is coupled to the second chamber (14) for providing a gaseous reactant to the second chamber.

9. The apparatus as claimed in claim 1 wherein the apparatus comprises a further separate chamber (3a) and a line for feeding a mixture of evaporate and converted solid deposit in the further separate chamber (3a) and comprises a line (4) for feeding a reactant into the separate chamber (3a).

10. A method for the conversion of pyrolytic fluids, comprising injecting coking liquid fuels into a reactor utilizing the apparatus of claim 1.

11. A method for conversion of a liquid fuel wherein in an apparatus for conversion of liquid fuels wherein in a space (7) separate from a chamber (3) a flow of liquid fuel drops (8) or a jet of liquid fuel is provided out of a nozzle (2), the nozzle being located remote from any hot zone in the chamber, said drops (8) or jet make a free fall through the space (7) and via an opening (7a) enter the chamber, without touching any solid surface before entering the chamber and whereby there is a solid angle defined by the nozzle tip and the opening in the chamber smaller than $\pi/4$ sr, fall on a heated evaporator body (9) in the chamber and are evaporated to form an evaporate, wherein a solid deposit (10) remains after evaporation on or in the evaporator body (9) and a reactant gas (11) is supplied for converting the solid deposit (10) to form a gaseous mixture.

12. The method as claimed in claim 11, wherein the mixture is reacted in the reaction zone (5) in the chamber (3) above or near the evaporator body (9).

13. The method as claimed in claim 12, wherein the mixture is led to a further chamber (3a) where it is reacted.

* * * * *